United States Patent [19]

Strobl, Jr. et al.

[11] Patent Number: 4,663,036
[45] Date of Patent: May 5, 1987

[54] SEPTIC SYSTEM DROP BOX WITH SEAL APPARATUS THEREFOR

[75] Inventors: Frederick P. Strobl, Jr., Cary; Theodore W. Meyers, Inverness, both of Ill.

[73] Assignee: Tuf-Tite, Inc., Barrington, Ill.

[21] Appl. No.: 754,187

[22] Filed: Jul. 10, 1985

Related U.S. Application Data

[63] Continuation of Ser. No. 634,967, Jul. 27, 1984, abandoned.

[51] Int. Cl.$^4$ .............................................. C02F 3/00
[52] U.S. Cl. .................................. 210/170; 210/532.2; 285/110; 285/193; 277/178
[58] Field of Search ................... 210/170, 532.1, 532.2; 285/7, 193, 192, 110; 277/178

[56] References Cited

U.S. PATENT DOCUMENTS

| | | | |
|---|---|---|---|
| 1,926,197 | 9/1933 | Durr | 285/193 |
| 2,244,280 | 6/1941 | Aghnides | 285/90 |
| 2,252,240 | 8/1941 | Tschappat | 288/5 |
| 3,221,881 | 12/1965 | Weiler | 210/136 |
| 3,363,799 | 1/1968 | Zurchea et al. | 220/42 |
| 3,408,091 | 10/1968 | Zylstra | 285/7 |
| 3,796,406 | 3/1974 | Ditcher | 249/11 |
| 3,813,107 | 5/1974 | Ditcher | 277/189 |
| 3,832,438 | 8/1974 | Ditcher | 264/274 |
| 3,943,971 | 3/1976 | Schmunk | 137/610 |
| 3,982,777 | 9/1976 | Martin | 285/192 |
| 4,007,941 | 2/1977 | Stancati | 277/178 |
| 4,020,868 | 5/1977 | Schmunk | 137/610 |
| 4,073,048 | 2/1978 | Ditcher | 29/450 |
| 4,097,380 | 6/1978 | Carlson | 210/170 |
| 4,103,901 | 8/1978 | Ditcher | 277/95 |
| 4,159,829 | 7/1979 | Ditcher | 277/189 |
| 4,230,157 | 10/1980 | Larsen et al. | 138/155 |
| 4,298,470 | 11/1981 | Stallings | 210/170 |
| 4,345,998 | 8/1982 | Graffis | 210/532.1 |
| 4,346,921 | 8/1982 | Gill et al. | 285/110 |
| 4,350,351 | 9/1982 | Martin | 277/207 A |
| 4,387,900 | 6/1983 | Ditcher et al. | 277/101 |

*Primary Examiner*—John Adee
*Attorney, Agent, or Firm*—Tilton, Fallon, Lungmus & Chestnut

[57] ABSTRACT

An improved drop box for septic systems is disclosed including a generally rectangular-shaped, tapered box member, a plurality of invert openings formed on the sidewalls thereof, a locking lid having structural support elements operable to transfer weight carried by the lid to the box's sidewalls, and improved seal means snap-fitted to each invert opening which act to sealingly receive a drain pipe forcibly inserted therethrough. A membrane-type seal plug is provided to block off any unused invert opening. An alternate version of the improved seal means having turbine-blade stiffening means is also disclosed.

19 Claims, 11 Drawing Figures

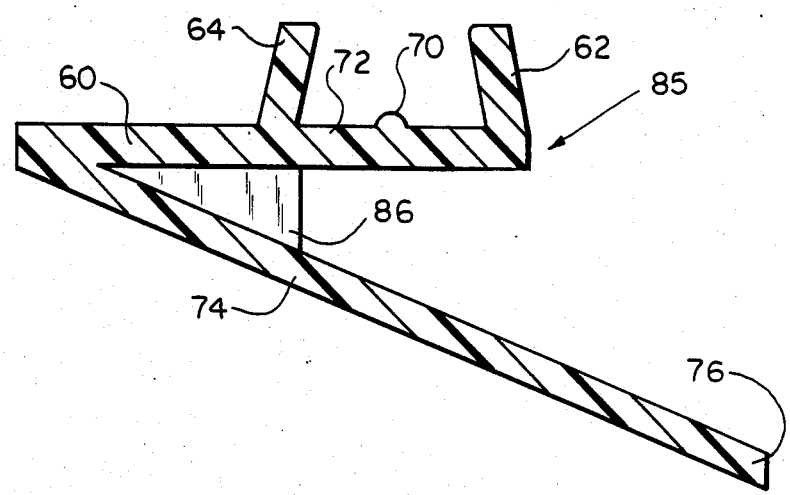
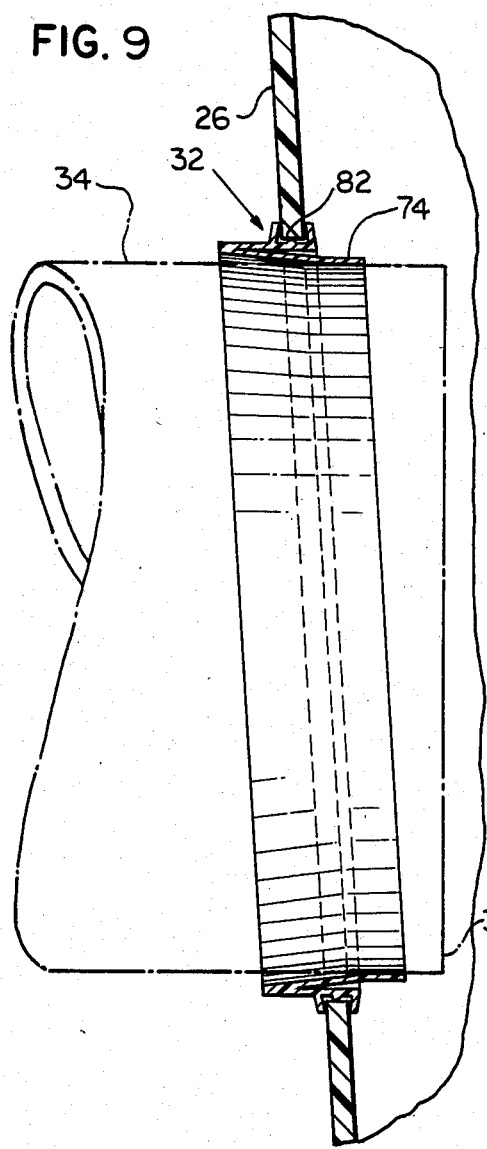
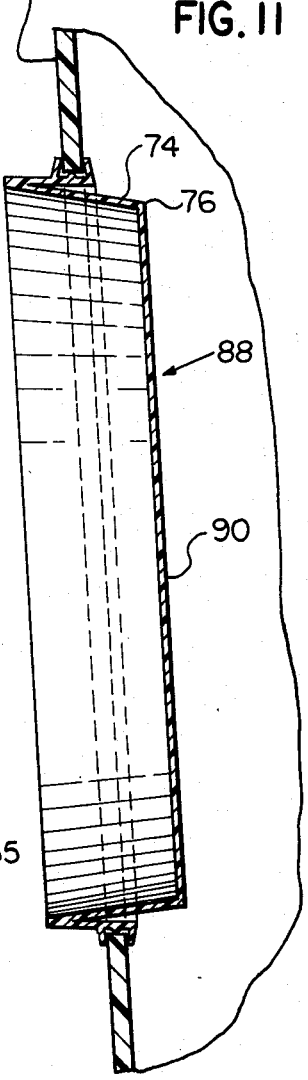

SEPTIC SYSTEM DROP BOX WITH SEAL APPARATUS THEREFOR

This application is a continuation of application 634,967 filed July 27, 1986 now abandoned.

BACKGROUND OF THE INVENTION

This invention relates to septic systems and, more particularly, to drop boxes for use in septic systems, including improved seal means used at the invert openings of such drop boxes.

The known prior art drop boxes comprise a box-shaped concrete structure having pairs of invert openings formed on respective opposing sidewalls thereof; typically the inflow and outflow drain tile openings are 6 to 8 inches higher than the lateral drain tile openings. Once the typical four inch diameter drain pipes are inserted through such invert openings, concrete mortar or grout, for example, is used to seal off the pipes against the drop box's sidewalls to prevent leakage. A generally planar concrete lid is used to cover an installed drop box, whereupon the box and lid are backfilled over to form part of a septic field system.

In use, such prior art drop boxes have many disadvantages, including the effects of movements of the respective drainage pipes relative to the drop box due to settling of backfill over time, as well as expansion and contraction due to temperature variations. Such movements cause leaks to occur at the grouted joints where the drain pipes extend through the drop box invert openings. Further, since the lids used with prior art drop boxes simply rested on top of the drop box, they oftentimes were inadvertently scraped off of the box, such as during landscaping preparations for the construction site. Further, due to the use of concrete, such prior art drop boxes often crumbled and otherwise disintegrated over time thereby limiting their useful life. The corrosive solutions present in most septic tank systems also acted to deteriorate concrete-type drop boxes.

Although neoprene and other rubber-type seals have been used for certain construction installations, such as with vent stacks extending through residential roof structures or with cast iron pipes used in certain plumbing applications, such alternate sealing arrangements have not proved satisfactory for use with septic drop boxes. Further, while there are numerous seal structures utilized to seal relatively large diameter water and sewer tiles to manholes, none have proved satisfactory for adaptation to septic drop boxes nor are readily usable in the field.

SUMMARY OF INVENTION

The improved drop box and seal means for septic systems of the present invention comprises a tapered, foursided, box member having a separate, tight-fitting lid. In the preferred embodiment, a first pair of opposed sidewalls of the box member have aligned openings formed therein for receiving inlet and outflow drain tiles. The remaining set of opposing sidewalls include, at a slightly lower level, a second set of aligned openings for receiving the lateral drain tiles. The box is preferably formed of an inert material, such as a plastic material. The separate locking lid has support ribs formed thereon for transferring weight loads carried by the lid to the four corners of the box.

A specially-configured seal member which snap-fits to each of the respective invert openings operates to seal the associated drain tile to the sidewall of the drop box. In use, the disclosed seal member acts to seal off, i.e., substantially eliminate any leakage around, the invert opening where a drain pipe enters the drop box. A separate membrane-type seal plug is also disclosed for blocking any unused invert openings.

It is a primary object of the present invention to provide a drop box for use in septic systems wherein the box is lightweight, formed of an inert material, and provided with a locking lid.

It is a further object of the present invention to provide a seal member which can be field-installed and which can sealingly accommodate any of the various standard types of drain tile used with septic systems, as well as accommodate drain tiles installed at rather severe angles relative to the drop box sidewall.

It is a still further object to provide an improved seal member for septic drop boxes which can be snap-fitted to any invert opening of a drop box to thereby clampingly and sealingly engage the sidewall.

It is yet a further object of the present invention to provide a plug-type seal member having a membrane for blocking off any unused invert opening.

The means by which the foregoing and other objects of the present invention are accomplished and the manner of their accomplishment will be readily understood from the following specification upon reference to the accompanying drawings, in which:

FIG. 8 is a cross section of the seal member of FIG. 7, taken at lines 8—8;

FIG. 9 is a sectional view, taken along lines 9—9 of FIG. 6 of the preferred seal member when installed in a drop box of the present invention;

FIG. 10 is a sectional view similar to FIG. 9, but depicting the present seal member under a specific loading situation; and FIG. 11 is a cross section of a seal plug member.

DESCRIPTION OF THE PREFERRED EMBODIMENT

Figure 1:
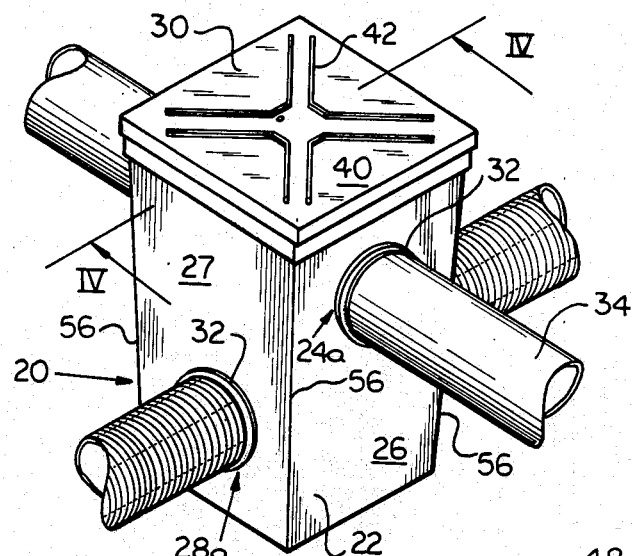
FIG. 1 is a perspective view of the septic drop box of the present invention with different types of drain tile inserted in the respective invert openings.

Having reference to the drawings, wherein like reference numerals indicate corresponding elements, there is shown in FIG. 1 an illustration of a preferred embodiment of the improved septic field system drop box of the present invention, generally denoted by reference numeral 20. The drop box 20 includes an open-topped, tapered, rectangular-shaped box member 22 having a pair (only one shown in FIG. 1) of upper invert openings 24a, 24b formed in opposing sidewalls 26, and a second pair (again only one shown) of lower invert openings 28a, 28b formed in the remaining set of opposing sidewalls 27. A locking lid 30 securely fits to the open top of the box member 22 as will be later described. The upper edges of the sidewalls 26, 27 of box member 22 terminate in a shouldered, continuous lip wall 58 (see FIG. 4). It will be understood that, instead of being formed in opposing drop box sidewalls 26, the aligned openings 24a, 24b (or openings 28a, 28b, for that matter) could be formed in adjacent sidewalls 26, 27, if desired.

Figure 4:
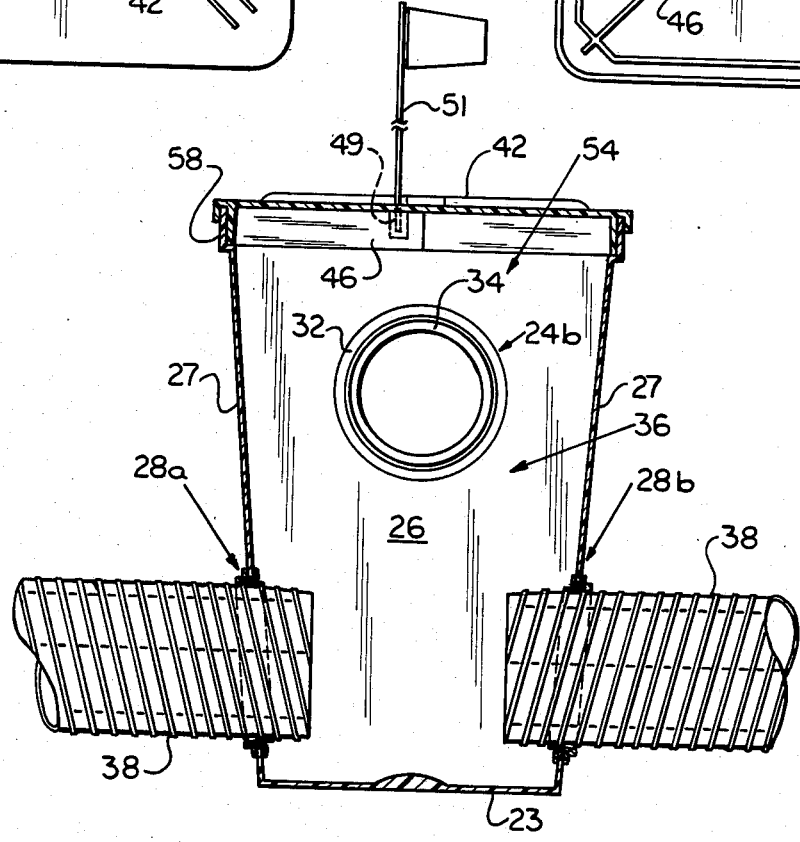
FIG. 4 is a side section of the drop box of FIG. 1, taken at lines 4—4 thereof.

A flexible seal member 32, described later herein, is snap-fitted into an upper opening 24a and sealingly receives a solid-walled, septic drain pipe or tile 34. A second, similarly-formed seal member 32 is also snap-fitted into a lower invert opening 28a whereupon a second or slotted and corrugated drain tile 38 is also sealingly received. As seen in FIG. 4, similar to tile 34 in FIG. 9, the drain tile 38 typically extends only a short distance into the inner chamber 36 of the box member 22.

Contrary to the prior art versions, the box member 22 and lid member 30 of the present invention are preferably formed of an inert material, such as a plastic material. For example, one preferred embodiment of box 22 and lid 30 comprised injection molded units formed of Low Density Polyethylene. Due to the presence of highly corrosive solutions in a typical septic field system, the use of such inert materials is highly advantageous as they prevent unwanted deterioration of the drop box's component parts.

Figure 2:
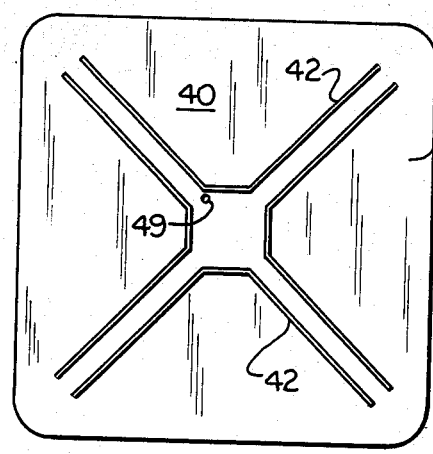
FIG. 2 is a top plan view of the upper drop box lid of the present invention.
Figure 3:
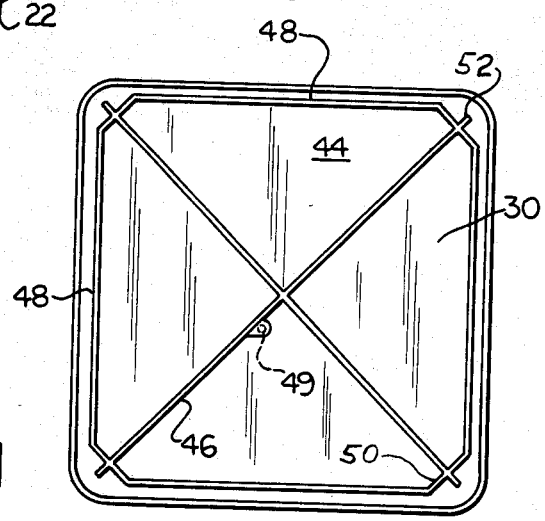
FIG. 3 is a bottom plan view of the drop box lid.

As noted in FIGS. 2 and 3, the lid member 30 has a series of raised channel rib members 42 projecting from its upper surface 40 and forming a general "X" shape, while the lower surface 44 has a correspondingly-shaped, elongated, protruding rib member 46. Also formed on lower lid surface 44 is a downwardly-extending, generally rectangular-shaped side wall member 48 which, at each of the respective four corners thereof, is integrally formed with a mitered corner section 50. A protruding nib portion 52 extends outwardly from each of the respective intersections of the elongated rib 46 and a corner wall section 50. The nib portion 52 is preferably beveled or radiused at its leading corner (not shown) to permit ease of entry of the lid member 30 into the corresponding opening 54 of the box member 22.

As can be seen in FIGS. 2 and 3, any downwardly-directed force, such as from the weight of earth backfilled over the lid 30 when installed, will be transferred by the ribs 42 and 46 to the respective four corners of the lid member 30, and hence, down the four respective sidewall corners 56 of box 22. Moreover, due to the specific configuration of the rib members 42, 46, a plurality of lids 30 can be stacked one upon another for ease of storage and shipping. Likewise, due to the preferred taper of drop box sidewalls 26, 27, a plurality of boxes 22 can be stacked together.

Preferably, the outer edge of lid wall 48 is tapered slightly inwardly (towards box opening 54) such that the wall member 48 and the box lip wall 58 when engaged thereto, cooperate to provide a force-fitted, sealing engagement between lid 30 and box 22. Moreover, besides effecting a sealing engagement between the lid and box, the tapered lid wall 48 and box wall 58 also cooperate to prevent the lid 30 from being inadvertently scraped-off or otherwise removed from box 22, such as by landscaping equipment used during final ground preparation at a construction site. Preferably, a socket 49 formed in lid 30 can be used to support the shaft of a warning flag 51 for location warning purposes.

Figure 5:
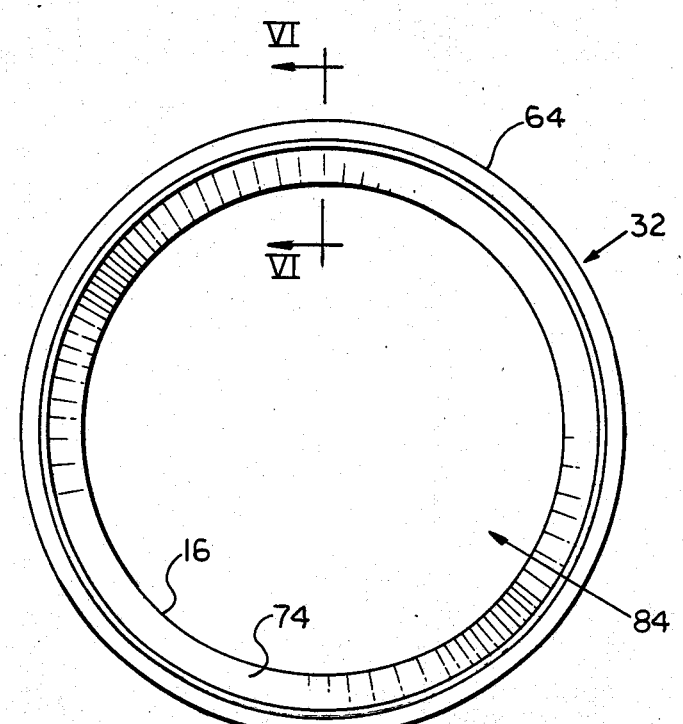
FIG. 5 is a plan view of the preferred seal member of the present invention.
Figure 6:
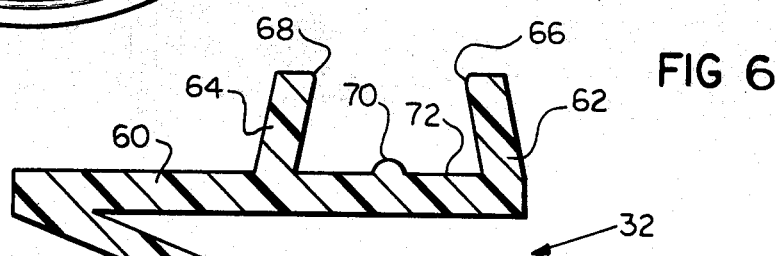
FIG. 6 is a cross section of the seal member of FIG. 5 taken at lines 6—6.

As seen in FIGS. 5 and 6, the preferred seal member 32 is formed with a specially-configured cross section and is generally flexible in use. The seal 32 comprises a central, cylindrical seal wall segment 60 having formed at one end thereof an outwardly projecting, annular locking rib 62. Also, formed somewhat centrally along the wall 60 of seal member 32 is a second outwardly projecting, annular locking rib 64. As seen in FIG. 6, the two locking ribs 62, 64 are preferably canted towards one another at their outer free ends. Also, a slight radius is formed on the opposing outer edges 66, 68, respectively of ribs 62 and 64. Such a radius helps permit ease of entry and snap-fitting of a seal member 32 into any of the invert openings 24a, 24b or 28a, 28b of box 22. There is also a raised annular sealing ring 70 formed in the outer cylindrical wall surface or "U"-shaped seat portion 72 of central wall 60; it is located at the approximate midpoint between the locking ribs 62, 64. At the end of central seal wall 60 opposite that end having first locking rib 62 is formed a downwardly and inwardly projecting wiper blade or extending wall segment 74, which terminates in annular free end 76. The wiper blade 74 is of a generally frusto-conical shape.

It will be understood that the canting of the respective locking ribs 62, 64 helps to maintain a positive sealing engagement and clamping grip of said ribs to the box sidewall. This is especially important when a relatively thick-walled drain pipe (such as a Schedule 40 pipe, for example) is forcibly inserted through the seal member 32. Also, this canting feature is helpful when a drain pipe must necessarily be inserted at a severe angle (horizontal and/or vertical) relative to the sidewall 26. Without the presence of such canting of the locking ribs 62, 64, it has been found that either of such field applications tend to forcibly pop-out, i.e., remove, the snap-fitted seal member 32 from the associated sidewall.

Preferably, the various segments comprising the seal member 32 are formed integrally from a relatively pliable inert substance, for example, an injection-molded plastic material such as Low Density Polyethylene or a Polyolefin Copolymer. The use of such flexible plastic materials for the seal 32 allows the wiper blade 74, which preferably is somewhat thinner in cross section than the central seal wall 60, to stretch slightly over the outer periphery of any tile forced therethrough. The present seal's ability to increase the overall diameter of wiper blade 74 (at its free end 76) provides two significant advantages. First, this stretching allows the preferred seal member 32 to accommodate various different types of presently available metal, clay, or plastic septic drain tiles, such as the common four inch diameter drain tiles, including those known as Schedule 20 (pipes having a relatively thin wall thickness), Schedule 30/34 (pipes having a standard wall thickness), and Schedule 40 (pipes having a heavy, i.e., relatively thick, wall thickness). Moreover, due to the limited stretchability of the wiper blade 74, the seal member 32 can accommodate even corrugated drain tile (such as the slotted drain tile 38 of FIG. 1). Second, the stretching of blade 74 about any tile inserted therethrough tends to further increase the sealing forces therebetween.

In use, the flexible seal member 32 is snap-fitted into any desired invert opening of the drop box, whereupon the seal's first and second locking ribs 62, 64 are respectively forced outwardly, i.e., clamped against the inner and outer surfaces of the box's sidewalls (see FIG. 19). Also, the sealing ring 70 acts to forcibly engage the sidewall edge 82 at the invert opening. To install a drain pipe to the seal 32 (see FIGS. 1 and 9), the free end 35 of pipe 34 is simply forcibly inserted into the opening 84 of seal wiper blade 74. Thus, when the drain pipe is inserted through the opening 84 of seal 32, the pressure on wiper blade 74 created by the pipe causes the blade 74 to force the central wall 60 and locking ribs 62, 64 outwardly further against the sidewall 26 of box 22 (see FIG. 9). When so compressed, the sealing ring 70, as well as the canted locking ribs 62, 64, operate to form a substantially liquid-free seal of the central seal wall 60 to the drop box sidewall 26. Further, the overall flexibility of seal 32 and its ability to be forcibly compressed are advantageous where the seal 32 is snap-fitted to a field-drilled (rather than factory-drilled) invert opening (not shown). There, where the hole may be drilled uneven and where sidewall flashing and burrs might otherwise prevent the seal 32 from forming a substantially watertight seal, the forced fit of the canted ribs 62, 64 and of the sealing ring 70 to the sidewall 26 act to compensate for any unevenness in the wall surface or invert opening once the drain pipe is inserted into the seal 32.

Figure 7:
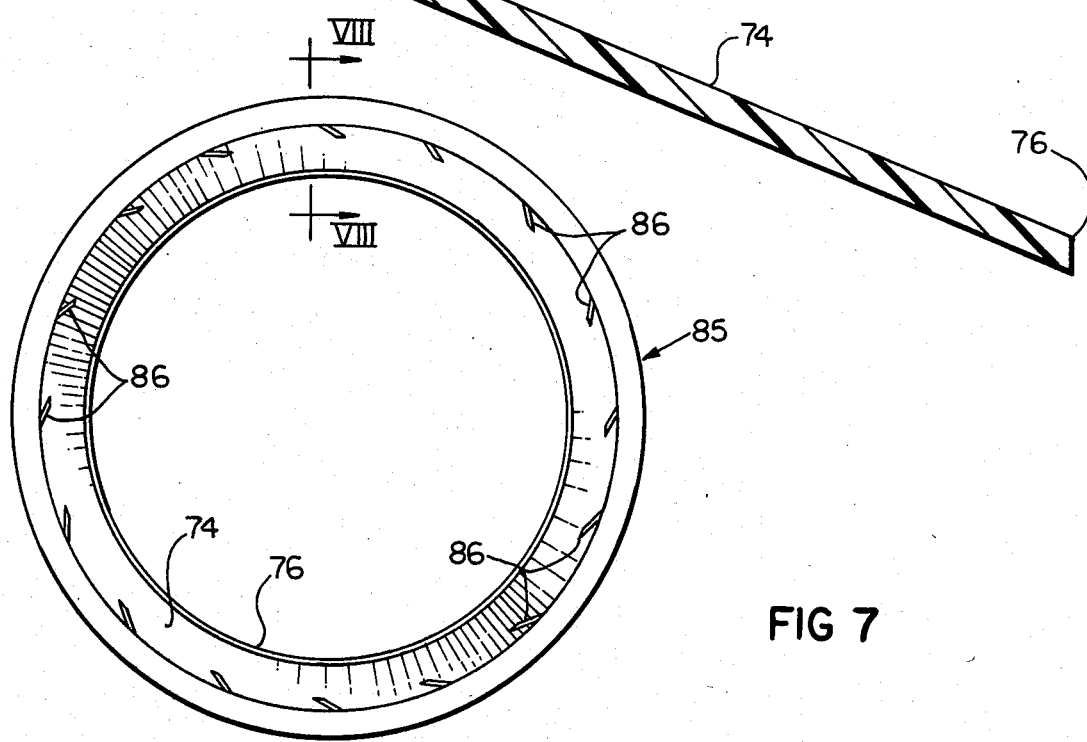
FIG. 7 is a plan view of an alternate form of seal member.

In FIGS. 7 and 8, there is seen an alternate embodiment of seal 32, namely, a modified seal member 85. The structure of seal 85 is the same as seal 32 except for the addition of plural turbine blade segments 86 formed at spaced locations about the angled intersection of seal wall segments 60 and 74. The presence of such angularly-oriented turbine blades 86 acts to further increase the structural rigidity of the flexible wiper blade wall 74. Also, such blade segments 86 enhance the sealing engagement forces of the free end 76 of wiper blade 74 against the outer wall of any associated drain pipe. Preferably, the blades 86 are not in perfect radial alignment relative to the wiper blade 74; rather, the angular orientation of blades 86 tends to increase their effectiveness. In effect, the turbine blades 86 tend to provide additional tensioning and stiffening of the outer seal wall 60 and the blade wall 74 as needed.

In FIG. 10 is depicted the seal 32 of the preferred embodiment and the pipe 34 in the installed position, similar to FIG. 9, but after the areas both below and above the pipe 34 have been backfilled with excavated earth, which backfilled earth has had a chance to settle over time. It will be understood that the bottom wall 23 of drop box 22 normally rests on undisturbed soil. This FIGURE then depicts the ability of seal 32 to accommodate a change of position of drain pipe 34, i.e., downwardly in FIG. 10, relative to the associated invert opening in sidewall 26. That is, due to the vertical flexibility and the stretchability of wiper blade portion 74 relative to the central seal wall 60, the lower wall portion 35 of pipe 34 tends to force the lower portion of wiper blade 74 down against the central wall 70, yet not allow the upper portion of blade 74 to break the sealing engagement with sidewall 26, i.e., pull away or gap the upper central wall portion 60 from the sidewall edge 82. The length of the wiper blade 74 can be adjusted as necessary to assure this seal retention, i.e., no gap, feature.

In FIG. 11 there is shown a seal plug member 88 which has a cross-sectional configuration similar to the preferred seal member 32, but also has integrally formed at the free end 76 of blade 74 a blocking element or seal membrane 90. The seal plug member 88 can be advantageously used when one or more of the factory-drilled invert openings in the drop box 22 are not utilized in a particular field installation. The seal plug 88 provides a watertight seal for those particular openings.

As will be appreciated by those skilled in the art, the relative length of the wiper blade 74 for either of seal members 32 or 85 can be changed to accommodate any particular design of drain tile, so as to assure the proper sealing engagement therewith. Further, when it is desired to connect a relatively small diameter pipe (say 3 inches or less O.D.) to the drop box 22, a seal plug 88 can first be installed. Then, after a smaller diameter opening has been field-drilled into the seal member 90, the smaller diameter pipe can be fastened to that small field opening, such as by use of a suitable caulk sealant.

From the foregoing, it is believed that those skilled in the art will readily appreciate the unique features and advantages of the present invention over previous types of septic system drop boxes and seals for use therewith. Further, it is to be understood that while the present invention has been described in relation to a particular preferred and alternate embodiments as set forth in the accompanying drawings and as above described, the same nevertheless are susceptible to change, variation and substitution of equivalents without departure from the spirit and scope of this invention. It is therefore intended that the present invention be unrestricted by the foregoing description and drawings, except as may appear in the following appended claims.

We claim:

1. In a septic tank system having a drop box connected by drain pipes, the improvement comprising:
    a drop box having a plurality of sidewalls and a bottom wall, and at least one invert opening formed in a sidewall of said box; and
    a lid for positively sealing off said drop box, the lid having stiffening rib means formed thereon operable to transfer weight carried by the lid to the sidewalls of said drop box, and locking means formed on said lid to cooperate with said sidewalls, whereby when said lid is installed on said drop box, a locking engagement of the lid to the drop box is provided.

2. The invention of claim 1 wherein said stiffening rib means are protruding rib members having a general "X"-shape and being aligned so as to transfer weight to the four corners of said drop box.

3. The invention of claim 1 wherein said locking means comprises a downwardly extending and inwardly tapered seal wall formed on said lid, said rib wall operable to be force-fitted to the respective upper edges of said drop box sidewalls.

4. The invention of claim 1 wherein said drop box sidewalls are tapered towards said bottom wall of said drop box, whereby a plurality of said drop boxes can be easily stacked for shipping and storage.

5. The invention of claim 2 wherein said rib members include a rib projecting upwardly from said lid and a corresponding set of channel ribs projecting downwardly from said lid, whereby, when a plurality of lids are stacked upon one another, the corresponding projecting rib of one lid nestles within the mating channel ribs of an adjacent lid.

6. The invention of claim 1, including a flexible seal member forcibly snap-fitted to a said invert opening of the drop box for sealingly receiving a drain pipe, the seal member comprising a cylindrical central wall member, a pair of generally radially-outwardly extending, locking rib members for clampingly and sealingly engaging said drop box sidewall adjacent said invert opening, and an inwardly projecting, generally frusto-conical shaped wiper blade member for sealingly engaging a drain pipe inserted therethrough.

7. The invention of claim 6 including a compression sealing ring formed on the outer surface of said central wall member between said locking rib members carried thereby, operable to sealingly engage the edge surface of said sidewall adjacent said invert opening.

8. The invention of claim 6 including blade means formed about the inner periphery of said cylindrical wall member at the junction therewith of said wiper blade wall member, said blade means operable to provide stiffening to said central wall member.

9. The invention of claim 8, wherein each of said blade means is angularly aligned relative to said central wall and said wiper blade member.

10. The invention of claim 6, wherein the free outer ends of said pair of locking rib members are canted towards one another.

11. An improved seal apparatus for providing substantially liquid-free sealing of drain tiles inserted through the invert openings formed in the sidewalls of a septic system drop box, the improvement comprising:
 a cylindrical seal wall member;
 a pair of clamping seal members extending generally radially outwardly from said cylindrical seal wall member, the outer free ends of said clamping seal members being inclined slightly towards one another; and
 a frusto-conical shaped wiper blade member flexibly carried by said seal wall member, said wiper blade member having a pipe-receiving opening at its inner free end;
 whereby said clamping seal members, when the improved seal apparatus is snap-fitted into an invert opening of a drop box sidewall, are operable to clampingly and sealingly engage the drop box sidewall adjacent the invert opening, and further, when a suitably-sized drain pipe is inserted through said pipe-receiving opening of said wiper blade member, said blade member operates to sealingly engage the drain pipe so as to prevent any leakage thereabout.

12. The invention of claim 9, including sealing ring means formed on said cylindrical wall member between the clamping seal members for sealingly engaging the peripheral edge surface of the drop box sidewall at the invert opening.

13. The invention of claim 9, including stiffening blade means formed between said cylindrical seal wall member and said wiper blade member, said stiffening blade means operable to strengthen the sealing engagement of said clamping seal members with the drop box sidewall and of said wiper blade with a drain pipe inserted therethrough.

14. An improved seal plug apparatus for providing substantially liquid-free sealing of unused invert openings formed in the side walls of a septic system drop box, the improvement comprising:
 a cylindrical seal wall member;
 a pair of clamping seal members extending generally radially outwardly from said cylindrical seal wall member, the outer free ends of said members being inclined slightly towards one another; and
 a seal membrane formed across said cylindrical seal wall member, whereby said clamping seal members, when the improved seal plug apparatus is snap-fitted into an unused invert opening of a drop box side wall, are operable to clampingly and sealingly engage the drop box side wall adjacent the invert opening, and further, said seal membrane is operable to provide a water-tight seal for the invert opening.

15. The invention of claim 14 and including a frusto-conical shaped wiper blade member carried at one end by said seal wall member, and carrying said seal membrane across its other end.

16. The invention of claim 11, wherein said pair of clamping seal members are of equal length.

17. An improved seal apparatus for providing substantially liquid-free sealing of openings in the sidewalls of a septic system box as well as to provide liquid-free sealing of any drain line inserted through such openings, the improvement comprising:
 a cylindrical seal wall member;
 seal flange attachment means extending generally radially outwardly from said cylindrical seal wall member for engagement with the sidewall of the septic system box;
 and a frusto-conical shaped wiper blade member depending from said seal wall member and having a relatively uniform thickness along its length, said wiper blade member having a seal membrane across its inner end;
 whereby said seal flange attachment means, when engaged with the sidewall of a septic system box, provides a sealed connection thereto, and further, said seal membrane provides a water-tight seal for the sidewall openings of the septic system box, whereby, if said seal membrane is removed, the inner free end of said wiper blade member operates to sealingly connect to the septic system box any drain pipe inserted through said seal apparatus.

18. The invention of claim 17, wherein said seal flange attachment means comprises a pair of clamping seal members extending generally radially outwardly of said cylindrical seal wall member.

19. The invention of claim 11, and including a seal membrane formed across the inner free end of said wiper blade member, whereby said seal apparatus provides a water-tight seal for the invert opening.

* * * * *